(12) United States Patent
Liu et al.

(10) Patent No.: US 11,375,474 B2
(45) Date of Patent: Jun. 28, 2022

(54) METHOD OF SENDING DOWNLINK INFORMATION, ACCESS AND MOBILITY MANAGEMENT FUNCTION ENTITY AND NETWORK FUNCTION ENTITY

(71) Applicants: China Mobile Communication Co., Ltd Research Institute, Beijing (CN); China Mobile Communications Group Co., Ltd., Beijing (CN)

(72) Inventors: Chao Liu, Beijing (CN); Tao Sun, Beijing (CN)

(73) Assignees: China Mobile Communication Co., Ltd Research Institute, Beijing (CN); China Mobile Communications Group Co., Ltd., Beijing (CN)

( * ) Notice: Subject to any disclaimer, the term of this patent is extended or adjusted under 35 U.S.C. 154(b) by 258 days.

(21) Appl. No.: 16/633,534

(22) PCT Filed: Jun. 14, 2018

(86) PCT No.: PCT/CN2018/091309
§ 371 (c)(1),
(2) Date: Jan. 24, 2020

(87) PCT Pub. No.: WO2019/024615
PCT Pub. Date: Feb. 7, 2019

(65) Prior Publication Data
US 2021/0368473 A1 Nov. 25, 2021

(30) Foreign Application Priority Data
Aug. 1, 2017 (CN) .......................... 201710646942.0

(51) Int. Cl.
*H04W 4/00* (2018.01)
*H04W 68/00* (2009.01)
(Continued)

(52) U.S. Cl.
CPC .......... *H04W 68/005* (2013.01); *H04W 4/20* (2013.01); *H04W 8/02* (2013.01); *H04W 68/02* (2013.01);
(Continued)

(58) Field of Classification Search
None
See application file for complete search history.

(56) References Cited

U.S. PATENT DOCUMENTS

2016/0066219 A1   3/2016 Poikonen
2019/0021064 A1*  1/2019 Ryu ...................... H04W 76/27

FOREIGN PATENT DOCUMENTS

| CN | 101094501 A | 12/2007 |
|---|---|---|
| CN | 101895986 A | 11/2010 |
| WO | WO 2010/062095 A2 | 6/2010 |

OTHER PUBLICATIONS

3GPP TS 23.502 v0.5.0 (Jul. 2017), 3rd Generation Partnership Project, 22 pages.
(Continued)

*Primary Examiner* — Suhail Khan
(74) *Attorney, Agent, or Firm* — Morgan, Lewis & Bockius LLP (57) ABSTRACT

A method of sending downlink information, an Access and Mobility Management Function entity and a Network Function entity are provided. The method of sending downlink information includes: receiving, by an AMF entity, a first notification message sent by a NF entity and configured to call a first service of the AMF entity; sending to the NF entity, by the AMF entity, indication information configured to indicate that a UE is in a connected state; receiving, by the AMF entity, a second notification message sent by the NF
(Continued)

entity and configured to call a second service of the AMF entity; and sending, by the AMF entity, downlink information to the UE.

12 Claims, 5 Drawing Sheets

(51) Int. Cl.
    *H04W 4/20*         (2018.01)
    *H04W 8/02*         (2009.01)
    *H04W 68/02*       (2009.01)
    *H04W 72/12*       (2009.01)
    *H04W 76/27*       (2018.01)

(52) U.S. Cl.
    CPC ........ *H04W 72/1278* (2013.01); *H04W 76/27* (2018.02)

(56) References Cited

OTHER PUBLICATIONS

Chinese Office Action (First) dated Mar. 20, 2020, for Chinese Patent Application No. 201710646942.0, 12 pages.
English Translation of Chinese Office Action (First) dated Mar. 20, 2020, for Chinese Patent Application No. 201710646942.0, 15 pages.
Chinese International Search Report with Written Opinion dated Feb. 13, 2020, for PCT/CN2018/091309, 9 pages.
International Preliminary Report on Patentability with Written Opinion (in English) dated Feb. 13, 2020, for PCT/CN2018/091309, 6 pages.
S2-186126 3GPP TSG-SA WG2 Meeting #127BIS, May 28-Jun. 1, 2018, Newport Beach, CA, USA, pp. 4.
S2-175509, SA WG2 Meeting #122 bis, Aug. 21-25, 2017, Sophia Antipolis, France, pp. 8.
Extended European Search Report dated Nov. 24, 2020 for European Patent Application No. 18841629.1, pp. 9.

\* cited by examiner

METHOD OF SENDING DOWNLINK INFORMATION, ACCESS AND MOBILITY MANAGEMENT FUNCTION ENTITY AND NETWORK FUNCTION ENTITY

CROSS REFERENCE OF RELATED APPLICATION

The present application is the U.S. national phase of PCT Application PCT/CN2018/091309 filed on Jun. 14, 2018, which claims a priority of Chinese patent application No. 201710646942.0 filed on Aug. 1, 2017, which is incorporated herein by reference in its entirety.

TECHNICAL FIELD

The present disclosure relates to the field of communication technologies, and in particular to a method of sending downlink information, an Access and Mobility Management Function entity and a Network Function entity.

BACKGROUND

Compared with the 4th-Generation (4G) network, the 5th-Generation (5G) network redefines a network architecture, and the core network adopts a service-based architecture. Network Function (NF) entities adopt a service-based interface (SBI).

Currently, in a service-based 5G core network architecture, an Access and Mobility Management Function (AMF) entity provides only two services: Namf_Communication service and Namf_EventExposure service. The Namf_Communication service is mainly used by other NF entities to use this service to interact with the User Equipment (UE) and radio access networks (RAN) through N2 and N1 interfaces to perform the packet data unit (PDU) session management and short message sending and receiving. The neighboring AMF entities use this service to perform the user context transfer and so on. The Namf_EventExposure service mainly includes: other NF entities use this service to subscribe or unsubscribe information such as the status and location of AMF entities. AMF entities use this service to report the status and location of AMF entities to other NF entities. Other NF entities are entities such as Unified Database (UDM) entity, Policy Control Function (PCF) entity, Session Management Function (SMF) entity and Network Exposure Function (NEF) entity.

The Namf_Communication service may be configured to send downlink information. When a network such as a UDM entity needs to send a downlink signaling to the UE, the signaling process generally includes: first, the UDM entity sends the issued downlink signaling to the AMF entity, by calling the Namf_Communication service of the AMF entity; then when the UE may be in an idle state, the AMF entity pages the UE; and after the UE receives the paging, the UE establishes a Radio Resource Control (RRC) connection to goes into the connected state and sends a service request message to the AMF entity; finally, the AMF entity sends a downlink signaling to the UE. When the network such as the SMF entity is to send downlink data to the UE, the signaling process generally includes: first, the SMF entity sends to the AMF entity, by calling the Namf_Communication service of the AMF entity, indication information to indicate that the SMF entity is to send downlink data; then, when the UE may be in an idle state, the AMF entity pages the UE, and after the UE receives the page, the UE establishes an RRC connection to goes into the connected state, and sends a service request message to the AMF entity; finally, the AMF entity initiates a process of establishing a user plane carrier to establish a data plane channel for the user.

SUMMARY

The present disclosure is to provide a method of sending downlink information, an Access and Mobility Management Function entity and a Network Function entity, to make full use of the service of AMF entity.

In a first aspect, a method of sending downlink information is provided in the embodiment of the present disclosure, including:

receiving, by an AMF entity, a first notification message sent by a NF entity and configured to call a first service of the AMF entity;

sending to the NF entity, by the AMF entity, indication information configured to indicate that a UE is in a connected state;

receiving, by the AMF entity, a second notification message sent by the NF entity and configured to call a second service of the AMF entity; and sending, by the AMF entity, downlink information to the UE.

In a second aspect, a method of sending downlink information is provided in the embodiment of the present disclosure, including:

sending to an AMF entity, by a NF entity, a first notification message configured to call a first service of the AMF entity;

receiving, by the NF entity, indication information sent by the AMF entity and configured to indicate that a UE is in a connected state; and sending to the AMF entity, by the NF entity, a second notification message configured to call a second service of the AMF entity.

In a third aspect, an AMF entity is provided in the embodiment of the present disclosure, including a transmitter and a receiver, where the receiver is configured to receive a first notification message sent by a NF entity and configured to call a first service of the AMF entity;

the transmitter is configured to send to the NF entity indication information configured to indicate that a UE is in a connected state;

the receiver is further configured to receive a second notification message sent by the NF entity and configured to call a second service of the AMF entity; and the transmitter is further configured to send downlink information to the UE.

In a fourth aspect, a NF entity is provided in the embodiment of the present disclosure, including a transmitter and a receiver, where the transmitter is configured to send to an AMF entity a first notification message configured to call a first service of the AMF entity;

the receiver is configured to receive indication information sent by the AMF entity and configured to indicate that a UE is in a connected state; and the transmitter is further configured to send to the AMF entity, by the NF entity, a second notification message configured to call a second service of the AMF entity.

In a fifth aspect, an AMF entity is provided in the embodiment of the present disclosure, including a memory, a processor and a computer program stored in the memory and executable on the processor, where the computer program is executed by the processor to perform the method of sending downlink information applied to the AMF entity.

In a sixth aspect, an NF entity, including a memory, a processor and a computer program stored in the memory and executable on the processor, where the computer program is executed by the processor to perform the method of sending downlink information applied to the NF entity.

In a seventh aspect, a computer-readable storage medium, where a computer program is stored in the computer-readable storage medium, the computer program is executed by a processor to perform the method of sending downlink information applied to the AMF entity.

In an eighth aspect, a computer-readable storage medium, where a computer program is stored in the computer-readable storage medium, the computer program is executed by a processor to perform the method of sending downlink information applied to the NF entity.

BRIEF DESCRIPTION OF THE DRAWINGS

In order to more clearly illustrate the technical solutions of the embodiments of the present disclosure, the drawings to be used in the description of the embodiments of the present disclosure will be briefly described below. It is obvious that the drawings in the following description are only some embodiments of the present disclosure. Other drawings may also be obtained by those of ordinary skill in the art based on these drawings without the inventive labor.

DETAILED DESCRIPTION

In the following, the technical solutions in the embodiments of the present disclosure will be clearly and completely described with reference to the drawings in the embodiments of the present disclosure. Obviously, the described embodiments are a part of embodiments of the present disclosure, but not all of them. Based on the embodiments of the present disclosure, all other embodiments obtained by a person of ordinary skill in the art without creative work shall fall within the scope of the present disclosure.

In the related art, the Namf_Communication service functions provided by the AMF entity are too large, which are not easy to be reduced or expanded flexibly or combined flexibly, so the advantage of the service-based is not given full play to, resulting in that the method of sending downlink information in the related art cannot make full use of the service of AMF entity.

In the embodiment of the present disclosure, compared with the related art, an independent service is added to the AMF entity, and the newly added service may specifically be a Mobile Terminated (MT) service or a Namf_MobileTermination EnableUEReachability service, which may be called when the NF entity (that is, other NF entities excepting the AMF entity) is to send downlink information. Specifically, when the NF is to send the downlink information, firstly the UE may call the new service of the AMF entity to enable the UE to go into the connected state, and then send the downlink information to the UE by calling the Namf_Communication service of the AMF entity. In this way, it is able to increase the services of the AMF entity and make the services of the AMF entity easier to be reduced and expanded or combined, and the process of sending the downlink information may make full use of the services of the AMF entity.

Figure 1:
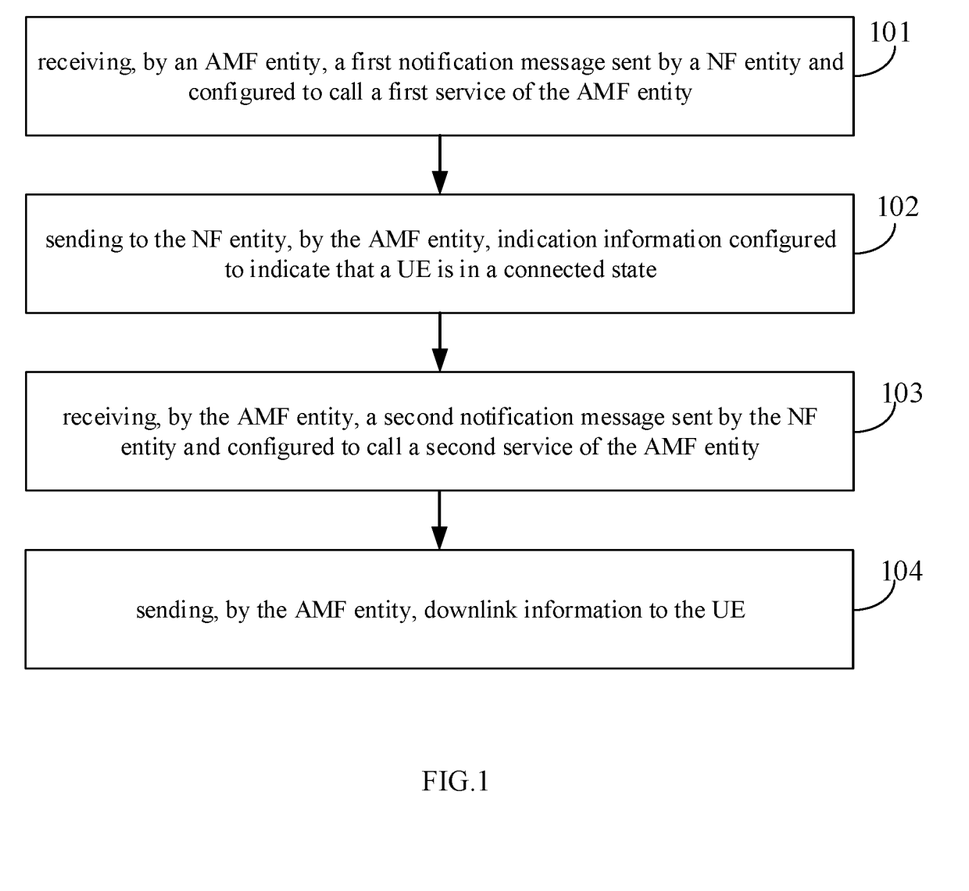
FIG. 1 is a flowchart of a method of sending downline information in a first embodiment of the present disclosure.

Referring to FIG. 1, a method of sending downlink information is provided in an embodiment of the present disclosure, which is applied to an AMF entity and includes:

Step 101: receiving, by an AMF entity, a first notification message sent by a NF entity and configured to call a first service of the AMF entity;

Step 102: sending to the NF entity, by the AMF entity, indication information configured to indicate that a UE is in a connected state;

Step 103: receiving, by the AMF entity, a second notification message sent by the NF entity and configured to call a second service of the AMF entity;

Step 104: sending, by the AMF entity, downlink information to the UE.

According to the method of sending downlink information in the embodiment of the present disclosure, by receiving a first notification message sent by a NF entity and configured to call a first service of the AMF entity, sending to the NF entity indication information configured to indicate that a UE is in a connected state, receiving a second notification message sent by the NF entity and configured to call a second service of the AMF entity and sending downlink information to the UE, the NF entity may firstly call the first service of the AMF entity when the NF entity is to send downlink information, to ensure that the UE goes into the connected state, and then NF entity may call the second service of the AMF entity to send the downlink information, thereby making full use of the service of the AMF entity.

In a specific embodiment of the present disclosure, the NF entity in step 101 is specifically other NF entities than the AMF entity in the network, such as a UDM entity, a PCF entity, an SMF entity, a NEF entity, and the like.

Optionally, after the AMF entity receives the first notification message, if the UE may be in an idle state, in order to ensure that the UE goes into the connected state, the AMF entity may initiate a paging until the UE is paged, and the UE establishes an RRC connection to go into the connection state. Therefore, when the UE is in an idle state, after step 101 and before step 102, the method in this embodiment of the present disclosure may further include:

sending a paging message configured to page the UE;

receiving a service request message sent by the UE.

In this way, after receiving the service request message sent by the UE, the AMF entity may determine that the UE has been into the connected state.

It should be noted that after step 101, when the UE is in a connected state, the AMF entity may directly perform step 102.

In a specific embodiment of the present disclosure, the first service is a new service of the AMF entity compared to the related art, and mainly performs the optional UE paging. Specifically, the first service may be an MT service, or a Namf_MobileTerminationEnableUEReachability service. In practical applications, the first notification message may be an MT service notification message. As the paging function of the AMF entity is relatively independent and does not involve any modification to the terminal context, the paging signaling accounts for a large proportion of the entire network signaling, and only some terminals need to use the paging service of the AMF entity, such as MICO terminals which do not need the paging service of the AMF entity. The quantity of paging signaling is strongly related to different deployment locations, different usage times and different customer types of the operator network. Therefore, the MT services in the AMF entity may meet the requirements for independent reduction and expansion of the AMF entity.

Correspondingly, the second service may be a Namf_Communication service, which is mainly used for sending downlink information.

In an embodiment of the present disclosure, the first notification message may carry indication information configured to indicate that the NF entity needs to send downlink information. The downlink information that the NF entity is to send may be a downlink signaling, downlink data or a downlink short message. Further, the downlink signaling may be a signaling that the NF entity needs to send to the UE, or may be a signaling for triggering the AMF entity to send a downlink signaling to the UE. For example, if the UDM entity sends a signaling A to the AMF entity, the signaling A is configured to trigger the AMF entity to send a signaling B to the UE, and then the AMF entity sends the signaling B to the UE.

When the downlink information that the NF entity needs to send is a downlink signaling, the second notification message may carry the downlink signaling. Correspondingly, the above Step 104 may further include:

sending, by the AMF entity, the downlink signaling to the UE, or the downlink signaling is sent by the AMF entity by triggering the AMF entity.

When the downlink information that the NF entity needs to send is downlink data, the second notification message may carry a user plane establishment signaling for instructing the AMF to establish a user plane for the downlink data. Correspondingly, the above Step 104 may further include:

establishing, by the AMF entity, a user plane data channel between the NF entity and the UE, to enable the NF entity to send the downlink data to the UE through the user plane data channel.

Figure 2:
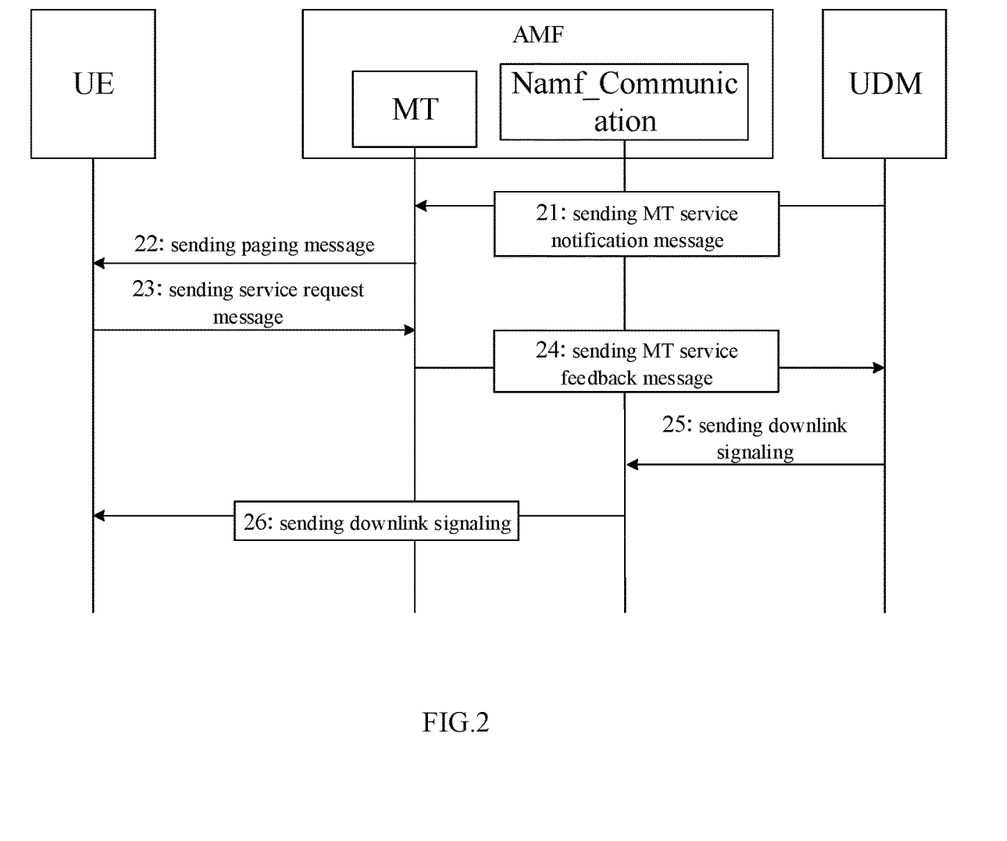
FIG. 2 is a flowchart of sending a downlink signaling by a UDM entity in a first specific example of the present disclosure.
Figure 3:
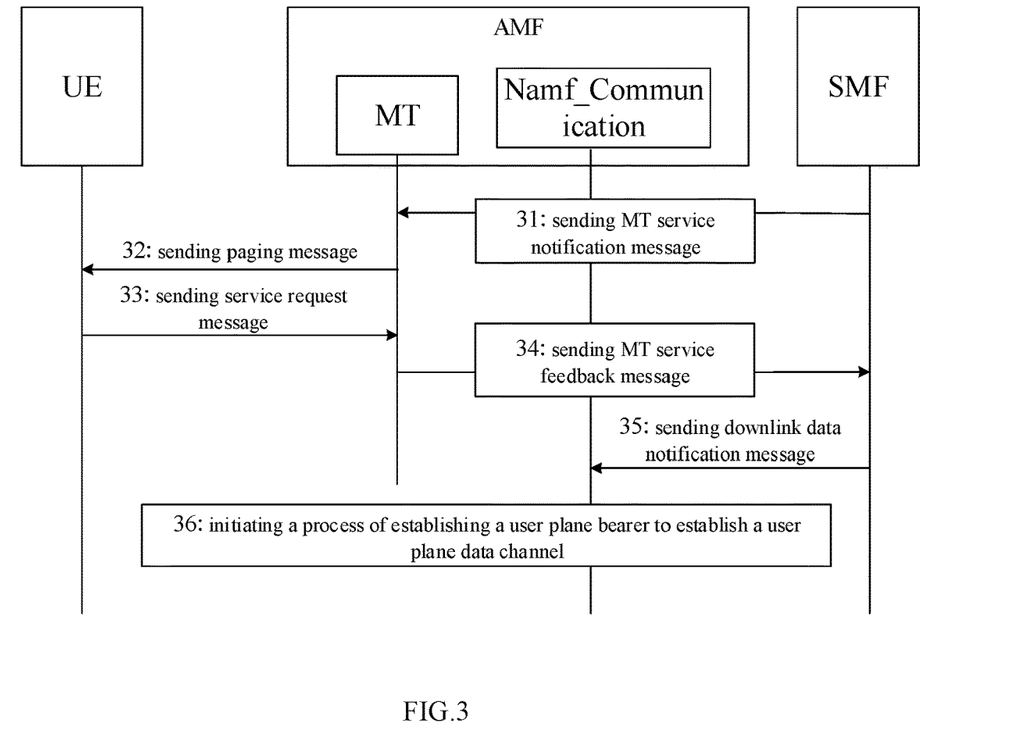
FIG. 3 is a flowchart of sending downlink data by an SMF entity in a second specific example of the present disclosure.

The following describes the sending process of the downlink information in the specific examples 1 and 2 of the present disclosure by taking the UDM entity and the SMF entity as examples, with reference to FIG. 2 and FIG. 3 respectively.

In the first example, the UDM entity needs to send downlink signaling and the UE may be in an idle state. The downlink signaling that the UDM entity needs to send may be the signaling that needs to be sent to the UE, or it may be the signaling that is configured to trigger the AMF entity to send a downlink signaling to the UE. Referring to FIG. 2, the sending process of the downlink information of the example 1 specifically includes:

Step 21: the UDM entity sends to the AMF entity an MT service notification message for calling the MT service of the AMF entity, and indicates that the UDM entity is to send downlink information;

Step 22: the AMF entity sends a paging message configured to page the UE;

Step 23: after receiving the paging message, the UE establishes an RRC connection to go into the connected state, and sends a service request message to the AMF entity;

Step 24: the AMF entity sends an MT service feedback message to the UDM entity, where the MT service feedback message carries indication information configured to indicate that the UE has been in the connected state;

Step 25: the UDM entity sends the downlink signaling to be sent to the AMF entity, and calls the Namf_Communication service of the AMF entity;

Step 26: the AMF entity sends downlink signaling to the UE, where the downlink signaling may be the signaling received by the AMF entity or the downlink signaling sent by the AMF entity by triggering the AMF entity.

In the second example, the SMF entity has downlink data to send and the UE may be in an idle state. Referring to FIG. 3, the sending process of the downlink information in the second embodiment further includes:

Step 31: The SMF entity sends an MT service notification message for calling the MT service of the AMF entity to the AMF entity, and instructs the UDM entity to send downlink information to be sent;

Step 32: the AMF entity sends a paging message configured to page the UE;

Step 33: After receiving the paging message, the UE establishes an RRC connection to goes into the connected state, and sends a service request message to the AMF entity;

Step 34: the AMF entity sends an MT service feedback message to the SMF entity, and the MT service feedback message carries indication information configured to indicate that the UE has been in the connected state;

Step 35: the SMF entity sends to the AMF entity a downlink data notification message for calling the Namf_Communication service of the AMF entity, and the downlink data notification message carries a user plane establishment signaling for instructing the SMF entity to establish a user plane for the downlink data;

Step 36: the AMF entity initiates a process of establishing a user plane bearer to establish a user plane data channel between the SMF entity and the UE, to enable the SMF entity to send the downlink data to the UE through the user plane data channel.

The foregoing embodiment describes the method of sending downlink information on the AMF entity side. The method of sending downlink information on the NF entity side will be described below with reference to the embodiment and the drawings.

Figure 4:
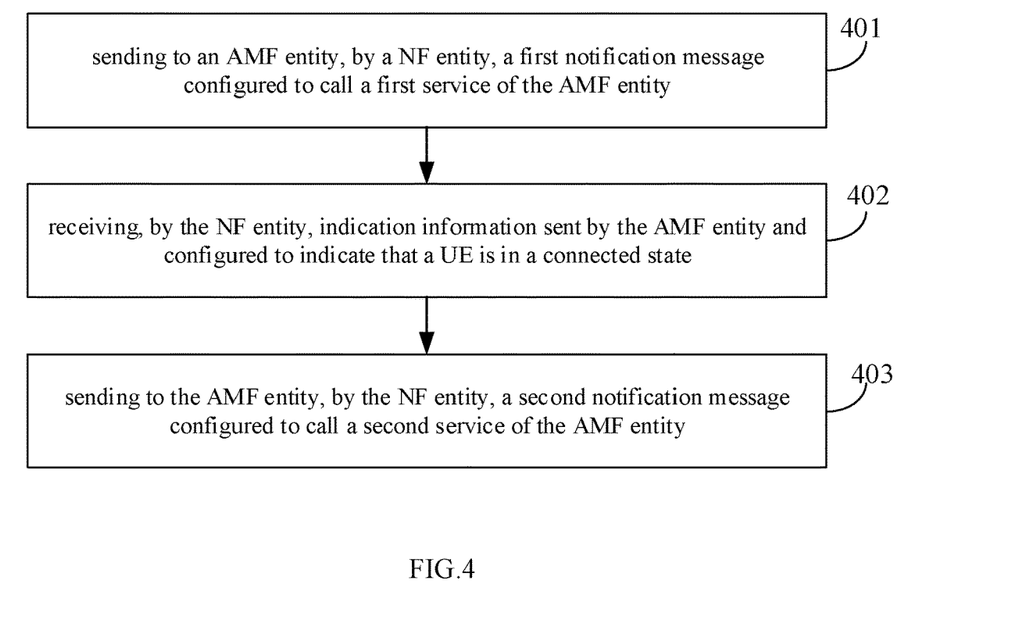
FIG. 4 is a flowchart of another method of sending downlink information in an embodiment of the present disclosure.

Referring to FIG. 4, a method of sending downlink information is further provided in an embodiment of the present disclosure, which is applied to an NF entity and includes:

Step 401: sending to an AMF entity, by a NF entity, a first notification message configured to call a first service of the AMF entity;

Step 402: receiving, by the NF entity, indication information sent by the AMF entity and configured to indicate that a UE is in a connected state; and Step 403: sending to the AMF entity, by the NF entity, a second notification message configured to call a second service of the AMF entity.

According to the method of sending downlink information in the embodiment of the present disclosure, by sending to an AMF entity, by a NF entity, a first notification message configured to call a first service of the AMF entity, receiving, by the NF entity, indication information sent by the AMF entity and configured to indicate that a UE is in a connected state; and sending to the AMF entity, by the NF entity, a second notification message configured to call a second service of the AMF entity, the NF entity may firstly call the first service of the AMF entity when the NF entity is to send downlink information, to ensure that the UE goes into the connected state, and then NF entity may call the second service of the AMF entity to send the downlink information, thereby making full use of the service of the AMF entity Optionally, the first service is an MT service.

Optionally, the second service is a Namf_Communication service.

In the embodiment of the present disclosure, the first notification message carries indication information configured to indicate that the NF entity is to send the downlink information.

Furthermore, the downlink information that the NF entity is to send is a downlink signaling, downlink data or a downlink short message, and the downlink signaling is that the NF entity is to send to the UE or the downlink signaling is configured to trigger the AMF entity to send a downlink signaling to the UE.

In the embodiment of the present disclosure, in the case that the downlink information that the NF entity is to send is the downlink signaling, the second notification message carries the downlink signaling.

In the embodiment of the present disclosure, in the case that the downlink information that the NF entity is to send is the downlink data, the second notification message carries a user plane establishment signaling configured to instruct the AMF to establish a user plane for the downlink data.

The above embodiment describes the method of sending downlink information of the present disclosure. The AMF entity and the NF entity of the present disclosure will be described below with reference to the embodiments and the drawings.

Figure 5:
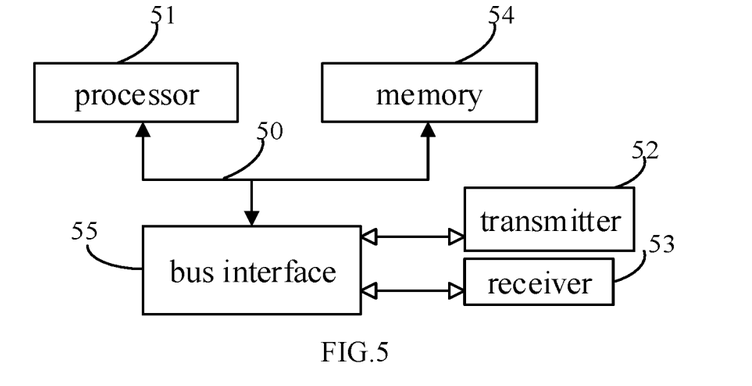
FIG. 5 is a schematic view of an AMF entity in an embodiment of the present disclosure.

Please refer to FIG. 5 which is a schematic view of an AMF entity in an embodiment of the present disclosure. As shown in FIG. 5, the AMF entity includes a processor 51, a transmitter 52 and a receiver 53;

the receiver 53 is configured to receive a first notification message sent by a NF entity and configured to call a first service of the AMF entity;

the transmitter 52 is configured to send to the NF entity indication information configured to indicate that a User Equipment (UE) is in a connected state;

the receiver 53 is further configured to receive a second notification message sent by the NF entity and configured to call a second service of the AMF entity; and the transmitter 52 is further configured to send downlink information to the UE.

Optionally, in the case that the UE is in an idle state, the transmitter 52 is further configured to send a paging message configured to page the UE, and the receiver 53 is further configured to receive a service request message sent by the UE.

Optionally, the first service is a MT service.

Optionally, the second service is a Namf_Communication service.

Optionally, the first notification message carries indication information configured to indicate that the NF entity is to send the downlink information.

Optionally, the downlink information that the NF entity is to send is a downlink signaling, downlink data or a downlink short message, and the downlink signaling is that the NF entity is to send to the UE or the downlink signaling is configured to trigger the AMF entity to send a downlink signaling to the UE.

Optionally, in the case that the downlink information that the NF entity is to send is the downlink signaling, the second notification message carries the downlink signaling; the transmitter 52 is further configured to send the downlink signaling to the UE, or the downlink signaling is sent by the AMF entity by triggering the AMF entity.

Optionally, in the case that the downlink information that the NF entity is to send is the downlink data, the second notification message carries a user plane establishment signaling configured to instruct the AMF to establish a user plane for the downlink data;

the AMF entity further includes a processor, and the processor 51 is configured to establish a user plane data channel between the NF entity and the UE, to enable the NF entity to send the downlink data to the UE through the user plane data channel.

In FIG. 5, the bus architecture (represented by the bus 50). The bus 50 may include any number of interconnected buses and bridges. One or more processors represented by the processor 51 and memories represented by the memory 54 are connected together by the bus 50. The bus 50 may also connect various other circuits such as peripheral devices, voltage regulators, and power management circuits, which are well known in the art, and therefore, they are not described further herein. The bus interface 55 provides interfaces among the bus 50, the transmitter 52, and the receiver 53. The transmitter 52 and the receiver 53 may be a transceiver providing a unit for communicating with various other devices on a transmission medium.

The processor 51 is responsible for managing the bus 50 and general processing, and the memory 54 may be configured to store data used by the processor 51 when performing operations.

Figure 6:
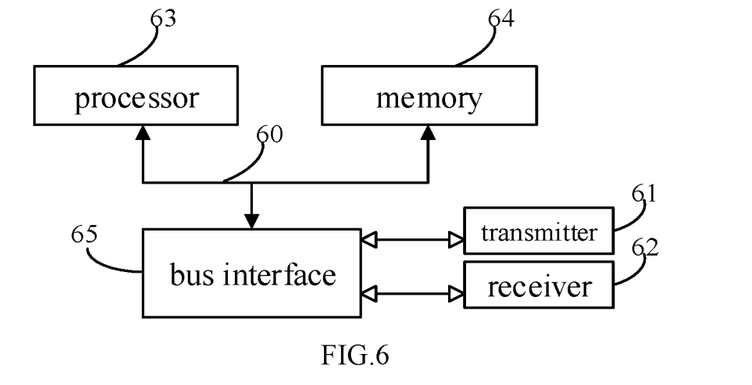
FIG. 6 is a schematic view of a NF entity in an embodiment of the present disclosure.

Referring to FIG. 6 which is a schematic view of an NF entity in an embodiment of the present disclosure. As shown in FIG. 6, the base station includes a transmitter 61 and a receiver 62;

the transmitter 61 is configured to send to an AMF entity a first notification message configured to call a first service of the AMF entity;

the receiver 62 is configured to receive indication information sent by the AMF entity and configured to indicate that a User Equipment (UE) is in a connected state; and the transmitter 61 is further configured to send to the AMF entity a second notification message configured to call a second service of the AMF entity.

Optionally, the first service is an MT service.

Optionally, the second service is a Namf_Communication service.

Optionally, the first notification message carries indication information configured to indicate that the NF entity is to send the downlink information.

Optionally, the downlink information that the NF entity is to send is a downlink signaling, downlink data or a downlink short message, and the downlink signaling is that the NF entity is to send to the UE or the downlink signaling is configured to trigger the AMF entity to send a downlink signaling to the UE.

Optionally, in the case that the downlink information that the NF entity is to send is the downlink signaling, the second notification message carries the downlink signaling.

Optionally, in the case that the downlink information that the NF entity is to send is the downlink data, the second notification message carries a user plane establishment signaling configured to instruct the AMF to establish a user plane for the downlink data.

In FIG. 6, a bus architecture (represented by a bus 60). The bus 60 may include any number of interconnected buses and bridges. One or more processors represented by the processor 63 and memories represented by the memory 64 are connected together by the bus 60. The bus 60 can also connect various other circuits such as peripheral devices, voltage regulators, and power management circuits, which are well known in the art, and therefore, they are not described further herein. The bus interface 65 provides an interface between the bus 60, the transmitter 61, and the receiver 62. The transmitter 61 and the receiver 62 may be a transceiver providing a unit for communicating with various other devices on a transmission medium.

The processor 63 is responsible for managing the bus 60 and general processing, and the memory 64 may be configured to store data used by the processor 63 when performing operations.

An AMF entity is provided in the embodiment of the present disclosure, including a memory, a processor and a computer program stored in the memory and executable on the processor, where the computer program is executed by the processor to perform the method of sending downlink information applied to the AMF entity, which may achieve the same technical effect. To avoid repetition, details thereof are not described herein again.

Figure 7:
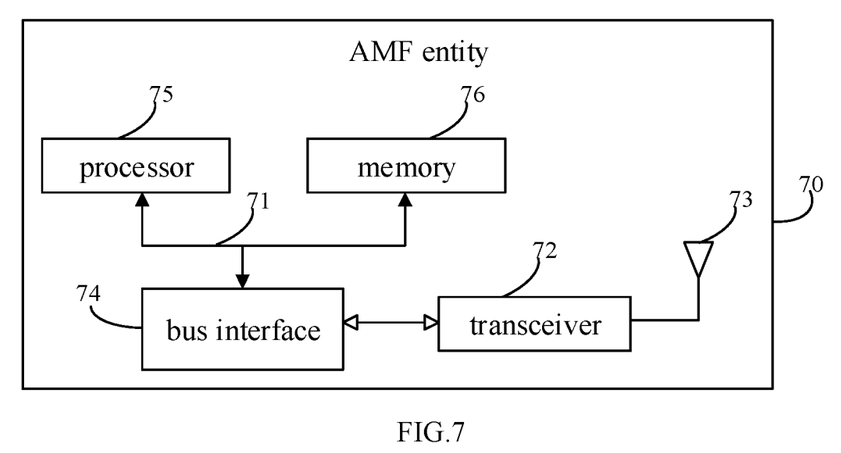
FIG. 7 is a schematic view of another AMF entity in an embodiment of the present disclosure.

Specifically, referring to FIG. 7, an AMF entity is provided in the embodiment of the present disclosure further provides. The AMF entity 70 includes a bus 71, a transceiver 72, an antenna 73, a bus interface 74, a processor 75 and a memory 76.

The processor 75 is configured to read a program in the memory 76 to:

control the transceiver 72 to receive a first notification message sent by a NF entity and configured to call a first service of the AMF entity; send to the NF entity indication information configured to indicate that a User Equipment (UE) is in a connected state; receive a second notification message sent by the NF entity and configured to call a second service of the AMF entity; and send downlink information to the UE.

The transceiver 72 is configured to receive and send data under a control of the processor 75.

Optionally, in the case that the UE is in an idle state, the processor 75 is configured to read a program in the memory 76 to control the transceiver 72 to send a paging message configured to page the UE, and receive a service request message sent by the UE.

Optionally, the first service is a Mobile Terminated (MT) service.

Optionally, the second service is a Namf_Communication service.

Optionally, the first notification message carries indication information configured to indicate that the NF entity is to send the downlink information.

Optionally, the downlink information that the NF entity is to send is a downlink signaling, downlink data or a downlink short message, and the downlink signaling is that the NF entity is to send to the UE or the downlink signaling is configured to trigger the AMF entity to send a downlink signaling to the UE.

Optionally, in the case that the downlink information that the NF entity is to send is the downlink signaling, the second notification message carries the downlink signaling, the processor 75 is configured to read a program in the memory 76 to control the transceiver 72 to send the downlink signaling to the UE, or the downlink signaling is sent by the AMF entity by triggering the AMF entity.

Optionally, in the case that the downlink information that the NF entity is to send is the downlink data, the second notification message carries a user plane establishment signaling configured to instruct the AMF to establish a user plane for the downlink data, the processor 75 is configured to read a program in the memory 76 to: establish a user plane data channel between the NF entity and the UE, to enable the NF entity to send the downlink data to the UE through the user plane data channel.

In FIG. 7, the bus architecture (represented by bus 71). The bus 71 may include any number of interconnected buses and bridges. One or more processors represented by the processor 75 and memories represented by the memory 76 are connected together by the bus 71. The bus 71 can also link various other circuits such as peripherals, voltage regulators, and power management circuits, which are well known in the art, and therefore, they are not described further herein. The bus interface 74 provides an interface between the bus 71 and the transceiver 72. The transceiver 72 may be a single element or multiple elements, such as multiple receivers and transmitters, providing a unit for communicating with various other devices over a transmission medium. The data processed by the processor 75 is transmitted on a wireless medium through the antenna 73. Further, the antenna 73 also receives the data and transmits the data to the processor 75.

The processor 75 is responsible for managing the bus 71 and general processing, and can also provide various functions, including timing, peripheral interfaces, voltage regulation, power management, and other control functions. The memory 76 may be configured to store data used by the processor 75 when performing operations.

Optionally, the processor 75 may be a CPU, an ASIC, an FPGA, or a CPLD.

A NF entity is provided in the embodiment of the present disclosure, including a memory, a processor and a computer program stored in the memory and executable on the processor, where the computer program is executed by the processor to perform the method of sending downlink information applied to the NF entity, which may achieve the same technical effect. To avoid repetition, details thereof are not described herein again.

Figure 8:
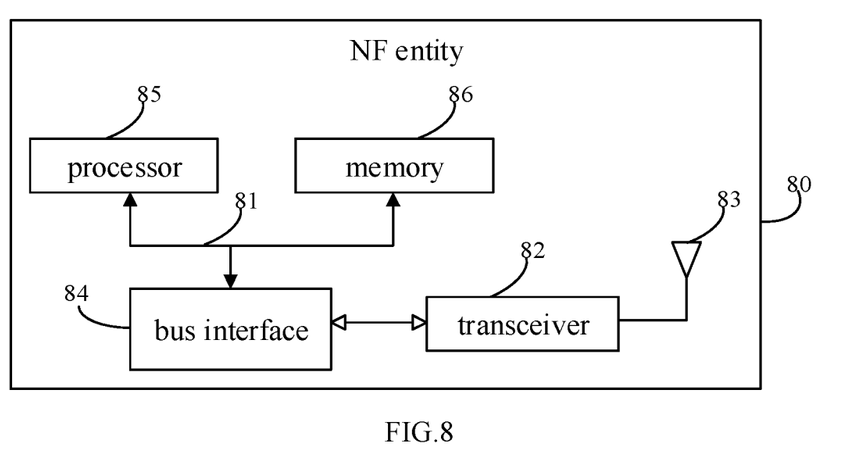
FIG. 8 is a schematic view of another NF entity in an embodiment of the present disclosure.

Specifically, referring to FIG. 8, a NF entity is further provided in an embodiment of the present disclosure. The NF entity 80 includes a bus 81, a transceiver 82, an antenna 83, a bus interface 84, a processor 85 and a memory 86.

The processor 85 is configured to read a program in the memory 86 and execute the following steps:

The control transceiver 82 sends a first notification message for invoking the first service of the AMF entity to the AMF entity, receives indication information sent by the AMF entity to indicate that the UE has entered the connected state, and sends the information to the AMF entity A second notification message for invoking a second service of the AMF entity.

The transceiver 82 is configured to receive and send data under the control of the processor 85.

Specifically, the first service is an MT service.

Specifically, the second service is a Namf_Communication service.

Specifically, the first notification message carries indication information configured to indicate that the NF entity needs to send downlink information.

Specifically, the downlink information that the NF entity needs to send is downlink signaling, downlink data, or downlink short message, and the downlink signaling is signaling that the NF entity needs to send to the UE, or is configured to trigger the AMF. The entity sends downlink signaling to the UE.

Specifically, when the downlink information that the NF entity needs to send is downlink signaling, the second notification message carries the downlink signaling.

Specifically, when the downlink information that the NF entity needs to send is downlink data, the second notification message carries user plane establishment signaling for instructing the AMF to establish a user plane for downlink data.

In FIG. 8, the bus architecture (represented by bus 81). The bus 81 may include any number of interconnected buses and bridges. One or more processors represented by the processor 85 and memories represented by the memory 86 are connected together through the bus 81. The bus 81 can also link various other circuits such as peripheral devices, voltage regulators, and power management circuits, which are well known in the art, and therefore, they will not be further described herein. The bus interface 84 provides an interface between the bus 81 and the transceiver 82. The transceiver 82 may be a single element or a plurality of elements, such as a plurality of receivers and transmitters, providing a unit for communicating with various other devices on a transmission medium. The data processed by the processor 85 is transmitted on a wireless medium through the antenna 83. Further, the antenna 83 also receives the data and transmits the data to the processor 85.

The processor 85 is responsible for managing the bus 81 and general processing, and can also provide various functions, including timing, peripheral interfaces, voltage regulation, power management, and other control functions. The memory 86 may be configured to store data used by the processor 85 when performing operations.

Optionally, the processor 85 may be a CPU, an ASIC, an FPGA, or a CPLD.

A computer-readable storage medium is further provided in the embodiments of the present disclosure, where a computer program is stored in the computer-readable storage medium, the computer program is executed by a processor to perform the method of sending downlink information applied to the AMF entity or the NF entity hereinabove, which may achieve the same technical effect. To avoid repetition, details thereof are not repeated here.

Specifically, when a computer-readable storage medium is applied to an AMF entity, the program is executed by a processor to:

receive a first notification message sent by a NF entity and configured to call a first service of the AMF entity; send to the NF entity indication information configured to indicate that a UE is in a connected state; receive a second notification message sent by the NF entity and configured to call a second service of the AMF entity; and send downlink information to the UE.

Optionally, in the case that the UE is in an idle state, the program is executed by the processor to: send a paging message configured to page the UE; receive a service request message sent by the UE.

Optionally, the first service is a Mobile Terminated (MT) service.

Optionally, the second service is a Namf_Communication service.

Optionally, the first notification message carries indication information configured to indicate that the NF entity is to send the downlink information.

Optionally, the downlink information that the NF entity is to send is a downlink signaling, downlink data or a downlink short message, and the downlink signaling is that the NF entity is to send to the UE or the downlink signaling is configured to trigger the AMF entity to send a downlink signaling to the UE.

Optionally, in the case that the downlink information that the NF entity is to send is the downlink signaling, the second notification message carries the downlink signaling, the program is executed by the processor to: send the downlink signaling to the UE, or the downlink signaling is sent by the AMF entity by triggering the AMF entity.

Optionally, in the case that the downlink information that the NF entity is to send is the downlink data, the second notification message carries a user plane establishment signaling configured to instruct the AMF to establish a user plane for the downlink data, the program is executed by the processor to: establish a user plane data channel between the NF entity and the UE, to enable the NF entity to send the downlink data to the UE through the user plane data channel.

Specifically, when a computer-readable storage medium is applied to an NF entity, the program is executed by a processor to:

send to an AMF entity a first notification message configured to call a first service of the AMF entity; receive indication information sent by the AMF entity and configured to indicate that a UE is in a connected state; and send to the AMF entity, by the NF entity, a second notification message configured to call a second service of the AMF entity.

Optionally, the first service is an MT service.

Optionally, the second service is a Namf_Communication service.

Optionally, the first notification message carries indication information configured to indicate that the NF entity is to send the downlink information.

Optionally, the downlink information that the NF entity is to send is a downlink signaling, downlink data or a downlink short message, and the downlink signaling is that the NF entity is to send to the UE or the downlink signaling is configured to trigger the AMF entity to send a downlink signaling to the UE.

Optionally, in the case that the downlink information that the NF entity is to send is the downlink signaling, the second notification message carries the downlink signaling.

Optionally, in the case that the downlink information that the NF entity is to send is the downlink data, the second notification message carries a user plane establishment signaling configured to instruct the AMF to establish a user plane for the downlink data.

Computer-readable media includes permanent and non-permanent, removable and non-removable media, and information can be stored by any method or technology. Information may be computer-readable instructions, data structures, modules of a program, or other data. Examples of computer storage media include, but are not limited to, phase change memory (PRAM), static random access memory (SRAM), dynamic random access memory (DRAM), other types of random access memory (RAM), and read-only memory (ROM), electrically erasable programmable read-only memory (EEPROM), flash memory or other memory technologies, read-only disc read-only memory (CD-ROM), digital versatile disc (DVD) or other optical storage, magnetic tape cartridges, magnetic tape storage or other magnetic storage devices or any other non-transmitting medium may be configured to store information that can be accessed by a computing device. As defined herein, computer-readable media does not include temporary computer-readable media, such as modulated data signals and carrier waves.

It should be noted that, in this article, the terms "comprise", "comprising" or any other variants thereof are intended to cover non-exclusive inclusion, so that a process, method, article or device including a series of elements includes not only those elements, It also includes other elements not explicitly listed, or elements inherent to such a process, method, article, or device. Without more restrictions, an element limited by the sentence "including a . . . " does not exclude that there are other identical elements in the process, method, article, or device that includes the element.

The sequence numbers of the foregoing embodiments of the present disclosure are merely for description, and do not represent the superiority or inferiority of the embodiments.

Through the description of the above embodiments, those skilled in the art can clearly understand that the methods in the above embodiments can be implemented by means of software plus a necessary universal hardware platform, and of course, also by hardware, but in many cases the former is better. Implementation. Based on such an understanding, the technical solution of the present disclosure, in essence, or a part that contributes to the existing technology, can be embodied in the form of a software product, which is stored in a storage medium (such as ROM/RAM, magnetic disk, optical disc) includes a plurality of instructions for causing a terminal device (which may be a mobile phone, a computer, a server, an air conditioner, or a network device, etc.) to execute the methods described in the embodiments of the present disclosure.

The above are merely some embodiments of the present disclosure. A person skilled in the art may make further modifications and improvements without departing from the principle of the present disclosure, and these modifications and improvements shall also fall within the scope of the present disclosure.

What is claimed is:

1. A method of sending downlink information, comprising:
   receiving, by an Access and Mobility Management Function (AMF) entity, a first notification message sent by a Network Function (NF) entity and configured to call a first service of the AMF entity;
   sending to the NF entity, by the AMF entity, indication information configured to indicate that a User Equipment (UE) is in a connected state;
   receiving, by the AMF entity, a second notification message sent by the NF entity and configured to call a second service of the AMF entity; and
   sending, by the AMF entity, downlink information to the UE,
   wherein the first notification message carries indication information configured to indicate that the NF entity is to send the downlink information,
   the downlink information that the NF entity is to send is a downlink signaling or downlink data,
   in the case that the downlink information that the NF entity is to send is the downlink signaling, the second notification message carries the downlink signaling, and the downlink signaling is a signaling configured to trigger the AMF entity to send a downlink signaling to the UE,
   the sending, by the AMF entity, the downlink information to the UE comprises:
      sending, by the AMF entity to the UE, the downlink signaling triggered to be sent by the AMF entity;
   in the case that the downlink information that the NF entity is to send is the downlink data, the second notification message carries a user plane establishment signaling configured to instruct the AMF to establish a user plane for the downlink data;
   the sending, by the AMF entity, the downlink information to the UE comprises:
      establishing, by the AMF entity, a user plane data channel between the NF entity and the UE, to enable the NF entity to send the downlink data to the UE through the user plane data channel.

2. The method according to claim 1, wherein subsequent to the receiving, by the AMF entity, the first notification message sent by the NF entity and configured to call the first service of the AMF entity, in the case that the UE is in an idle state, prior to the sending to the NF entity, by the AMF entity, the indication information configured to indicate that the UE is in the connected state, the method further comprises:
   sending a paging message configured to page the UE;
   receiving a service request message sent by the UE.

3. The method according to claim 1, wherein subsequent to the receiving, by the AMF entity, the first notification message sent by the NF entity and configured to call the first service of the AMF entity, in the case that the UE is in the connected state, the AMF entity sends to the NF entity the indication information configured to indicate that the UE is in the connected state.

4. The method according to claim 1, wherein the first service is a Mobile Terminated (MT) service.

5. The method according to claim 1, wherein the second service is a Namf_Communication service.

6. A method of sending downlink information, comprising:
   sending to an Access and Mobility Management Function (AMF) entity, by a Network Function (NF) entity, a first notification message configured to call a first service of the AMF entity;
   receiving, by the NF entity, indication information sent by the AMF entity and configured to indicate that a User Equipment (UE) is in a connected state; and
   sending to the AMF entity, by the NF entity, a second notification message configured to call a second service of the AMF entity,
   wherein the first notification message carries indication information configured to indicate that the NF entity is to send the downlink information,
   the downlink information that the NF entity is to send is a downlink signaling or downlink data,
   in the case that the downlink information that the NF entity is to send is the downlink signaling, the second notification message carries the downlink signaling, and the downlink signaling is a signaling configured to trigger the AMF entity to send a downlink signaling to the UE,
   in the case that the downlink information that the NF entity is to send is the downlink data, the second notification message carries a user plane establishment signaling configured to instruct the AMF to establish a user plane for the downlink data, and the downlink signaling is that the NF entity is to send to the UE or the downlink signaling is configured to trigger the AMF entity to send a downlink signaling to the UE.

7. The method according to claim 6, wherein the first service is a Mobile Terminated (MT) service.

8. The method according to claim 6, wherein the second service is a Namf_Communication service.

9. A Network Function (NF) entity, comprising a memory, a processor and a computer program stored in the memory and executable on the processor, wherein the computer program is executed by the processor to perform the method of sending downlink information according to claim 6.

10. An Access and Mobility Management Function (AMF) entity, comprising a transmitter and a receiver, wherein
the receiver is configured for receiving a first notification message sent by a Network Function (NF) entity and configured to call a first service of the AMF entity;
the transmitter is configured for sending to the NF entity indication information configured to indicate that a User Equipment (UE) is in a connected state;
the receiver is further configured for receiving a second notification message sent by the NF entity and configured to call a second service of the AMF entity; and
the transmitter is further configured for sending downlink information to the UE,
wherein the first notification message carries indication information configured to indicate that the NF entity is to send the downlink information,
the downlink information that the NF entity is to send is a downlink signaling or downlink data,
in the case that the downlink information that the NF entity is to send is the downlink signaling, the second notification message carries the downlink signaling, and the downlink signaling is a signaling configured to trigger the AMF entity to send a downlink signaling to the UE,
sending the downlink information to the UE comprises:
sending, to the UE, the downlink signaling triggered to be sent by the AMF entity;
in the case that the downlink information that the NF entity is to send is the downlink data, the second notification message carries a user plane establishment signaling configured to instruct the AMF to establish a user plane for the downlink data;
sending the downlink information to the UE comprises:
establishing a user plane data channel between the NF entity and the UE, to enable the NF entity to send the downlink data to the UE through the user plane data channel.

11. The AMF entity according to claim 10, wherein in the case that the UE is in an idle state, the transmitter is further configured to send a paging message configured to page the UE, and the receiver is further configured to receive a service request message sent by the UE.

12. The AMF entity according to claim 10, wherein the first service is a Mobile Terminated (MT) service; or
the second service is a Namf_Communication service.

* * * * *